Jan. 11, 1966 A. R. CURLL, JR., ETAL 3,229,176

ELECTRONICALLY CONTROLLED MEANS FOR POSITIONING ROTATABLE SHAFTS

Filed Feb. 25, 1963

INVENTORS
ALLAN R. CURLL, JR.
BURAN I. KEPRTA, JR.
DERIL T. WEBB

BY Harry W. Hargis III
AGENT

United States Patent Office 3,229,176

Patented Jan. 11, 1966

3,229,176

ELECTRONICALLY CONTROLLED MEANS FOR POSITIONING ROTATABLE SHAFTS

Allan R. Curll, Jr., Ardmore, and Buran I. Keprta, Jr., and Deril T. Webb, Norristown, Pa., assignors to Philco Corporation, Philadelphia, Pa., a corporation of Delaware Filed Feb. 25, 1963, Ser. No. 260,805
4 Claims. (Cl. 318—16)

This invention relates to positioning means, and more particularly to electronically controlled means for positioning rotatable shafts.

In the field of television receivers, it has become increasingly popular to provide remotely actuated tuning devices that also can be actuated manually. In many such devices, mechanical linkage has been provided to prevent initiation of the automatic tuning functions upon manual actuation of the tuning device. Mechanical linkage for this purpose requires relatively intricate alignment to ensure proper operation.

It is therefore an objective of this invention to provide novel electrical circuit actuated means, in combination with a tuning device, to minimize the required adjustments.

The invention has for another objective the provision of novel, electrically controlled, remotely actuatable means for operating rotatable mechanisms through predetermined sequential angular increments.

Still another object of the invention is the provision of a remotely actuatable positioning mechanism which is automatically operable, in response to a signal of relatively brief duration, to drive a rotary device coupled therewith, moving it from one position to another, and then to deenergize the mechanism.

It is also an object of the invention to provide positioning apparatus for a rotary device, affording, selectively, either automatic or manual operation thereof.

In achievement of the foregoing as well as other objectives, a preferred embodiment of the invention comprises motorized self-cycling drive means for positioning a rotatable shaft, said means including mechanical linkage elements that are moved sequentially through predetermined angular increments, each increment corresponding to a different television channel, as provided by a rotatable channel selector coupled with a rotatable shaft. Energization of the motor is effected and maintained by a novel circuit controlled holding switch arrangement actuatable in response to reception of a signal from a remote signal producing device, and indexing means driven with the shaft is so constructed and arranged as to condition the circuit to deenergize the motor when the shaft is rotated to the next preselected indexed position.

It is a feature of the invention that the shaft can be rotated manually to any desired indexed position without initiating automatic stepping of the mechanism, inasmuch as automatic stepping can only be initiated by introduction of a signal to the holding circuit.

The manner in which the objectives of the invention may best be achieved will be more clearly understood from a consideration of the following description, taken in light of the accompanying drawing in which.

Figure 1:
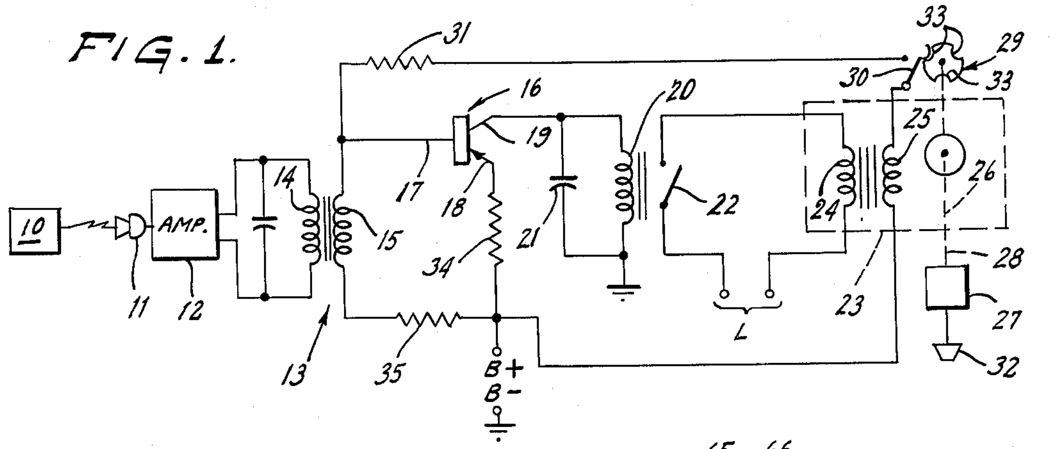
FIGURE 1 is a schematic circuit diagram, with portions in block form, illustrating a remote control system embodying the invention.

With reference to FIGURE 1 of the drawing, a remote control system embodying the invention includes a transmitter 10 which in accordance with prior art practice may comprise a plurality of resonators (not shown) which produce desired remote control signals. The signal is receivable by a microphone 11 connected to an amplifier 12, where it is amplified and applied to the primary winding 14 of a tuned transformer 13. The secondary winding 15 of transformer 13 is connected to the control elcetrode of a signal translating device, such for example as the base 17 of a transistor 16, comprising also emitter electrode 18 and collector electrode 19, whereby the amplified signal may be fed into the transistor. Transistor 16 is adapted to function as a combined relay driver and detector, and will develop a D.C. voltage, by reason of its non-linearity, in response to the A.C. signal delivered by transformer 13. Transistor 16 is capable of amplifying the D.C. by virtue of its gain characteristic, the amplified D.C. attaining a value sufficient to energize a relay coil 20. A condenser 21 is disposed in electrical shunt circuit with relay coil 20, and is adapted to prevent deleterious effects of A.C. components on the coil.

Relay coil 20 is disposed and adapted when energized to close a switch 22 which will apply 60 cycle A.C. energy from a suitable source L to the main winding 24 of an induction motor 23. The motor shaft 26 is drivingly coupled with the shaft 28 of a television tuner 27 and with an indexing or programming wheel 29 provided with a plurality of angularly spaced detents 33, each corresponding to a different television channel. In the position shown, indexing switch 30 is opened by virtue of its having moved into one of detents 33. To close switch 30, the wheel 29 must be rotated so that the switch is moved out of the detent and is engaged by the curved rim of wheel 29. The construction and arrangement is such that when motor winding 24 is energized initially, shafts 26 and 28 will be moved through a small angular increment, whereby indexing wheel 29 is rotated to close switch 30 connected to an auxiliary motor winding 25 inductively coupled with main motor winding 24.

Switch 30 further is connected in the circuit so that its closing will cause voltage induced in auxiliary motor winding 25 to be applied to base 17 of the transistor through a resistor 31. Voltage thus applied provides sufficient current to hold transistor 16 in operation to maintain energization of relay coil 20 connected as shown to ground and collector electrode 19, irrespective of the fact that, since motor 23 requires appreciable time to move tuner 27 from one indexed channel position to the next indexed channel position, the signal impulse will have ceased before the tuner has completed its change of channels.

Were it not for the holding circuit, the cessation of signal would cause relay coil 20 to be deenergized thereby opening switch 22 and deenergizing motor 23. However, it will be appreciated that the energy supplied by auxiliary winding 25 to base 17 of transistor 16 through indexing switch 30 and resistor 31 will ensure sustained energization of the relay and continued closure of switch 22.

When tuner 27 arrives at its next indexed position, indexing switch 30 is opened and the energy from the motor winding 25 is no longer supplied to the transistor. Relay coil 20 is therefore deenergized to open switch 22 and deenergize motor 23.

If the tuner is manually rotated by knob 32 provided for that purpose, indexing switch 30 will close as detent 33 of indexing wheel 29 moves out of engagement with the switch actuating arm. However, closing of switch 30 will not supply energy from auxiliary motor winding 25 since the main motor winding 24, to which it is inductively coupled, is not energized. Therefore, manual operation of the channel selector cannot cause relay coil 20 to become energized to institute automatic operation of the tuner mechanism.

Considering the circuit further, resistor 31 is adapted to prevent the auxiliary motor winding 23 from loading or detuning transformer 13, if indexing switch 30 should happen to be closed during the reception of a signal from transmitter 10. This condition may exist if, for example, tuner 27 is resting on a channel not programmed on indexing wheel 29 and remote control transmitter 10 is used to change channels.

Additionally with respect to FIGURE 1, a resistor 34 connects emitter 18 to B+ to bias transistor 16 into proper operating condition, and one side of transformer winding 15 is returned through a resistor 35 to B+ to prevent a change of bias which normally would occur through the D.C. path comprising base 17 of transistor 16, resistor 31, switch 30, and winding 25.

Figure 2:
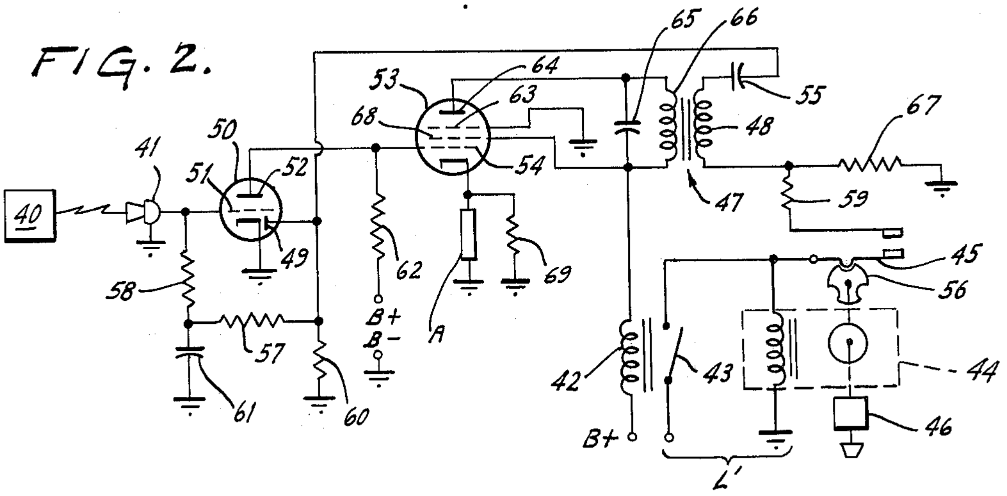
FIGURE 2 is similar to FIGURE 1 and illustrates a modified embodiment of the invention.

With reference to the modified embodiment of the invention illustrated in FIGURE 2, signal translating devices in the form of electron tubes are used instead of a transistor and one side of the A.C. line L′ is grounded. As will be appreciated from what follows, the circuit of FIGURE 2 is so constructed and arranged that a signal applied to the microphone 41 by means of a transmitter 40 will energize a relay coil 42 to close switch 43 and apply 120 volts A.C. from source L′ to the tuner drive motor 44 and energize the same. Indexing switch 45 is closed upon a few degrees of initial rotation of the energized motor 44 and the indexing wheel 56 and tuner 46 coupled therewith. Closing of the series connected switches 43 and 45 applies 60 cycle A.C. (approximately 3 volts r.m.s.) to the detector diode 49 in the tube 50 (e.g. a 4AV6 tube) through the series circuit comprising resistor 59, resistor 60 connected to ground, the secondary coil 48 of the transformer 47, and condenser 55, in combination with resistor 67 connected in parallel with elements 48, 55, and 60 of the series circuit just described.

The detector diode 49 of tube 50 develops a negative D.C. potential (approximately −2 volts, for example) by virtue of the 60 cycle A.C. applied as described above. This negative D.C. potential applied through resistors 57 and 58 to the grid 51 performs the same function as the negative D.C. voltage developed when an A.C. signal from transmitter 40 is applied to the grid 51. A condenser 61 is connected to ground and to the juncture of resistors 57 and 58 as shown, and serves to filter out undesired AC components.

The negative D.C. voltage applied to the grid 51 raises both the voltage of plate 52, connected through loading resistor 62 to B+ as shown, and the voltage of grid 54 of tube 53 (e.g. a 4CB6 tube) connected to plate 52. Raising the voltage of grid 54 causes the stage comprising the tube and its grid 63, plate 64, and screen grid 68, and the parallel circuit connected to the tube as shown and including condenser 65 and primary coil 66, to maintain high current through the relay coil 42 connected in series with the stage and B+. Relay switch 43 is therefore closed until motor 44 drives the tuner 46 and indexing wheel 56 to the next indexed channel, at which time switch 45 is opened. Opening switch 45 removes the 60 cycle A.C. from the detector diode 49 of tube 50, and allows tube 53 to return to its standby current position to deenergize the relay coil 42. The relay switch 43 then opens to deenergize the motor and halt tuner 46 on its selected channel position.

As in the embodiment of FIGURE 1, which has a resistor 34 in the emitter circuit, the cathode of tube 53 may be returned to ground merely through a suitable resistor 69. Preferably, however, the cathode bias circuit comprises the parallel combination of a resistor 69 and a varistor A as shown. The presence of the varistor enables the use of a very high effective cathode bias resistance during no-signal conditions, i.e. when the current in the tube

53 is low. This is the case because the resistance of a varistor is high when the current therethrough is low. However when signal is applied to grid 54, the current through tube 53 increases and the resistance of varistor A decreases in accordance with its characteristic. This greatly increases the ratio of signal to no-signal current through the tube, and permits use of a less sensitive relay 42. A relay driving circuit embodying a varistor in combination with signal translating means, such as an electron valve, is disclosed and claimed in the copending application of Buran I. Keprta, Jr., and Henry S. Vasilevskis, Serial No. 246,412, filed December 21, 1962, and assigned to the assignee of the present invention. While not necessary to an understanding of the present invention, reference may be had to the copending application for a more detailed description of the theory and operation of such a circuit.

When tuner 46 is rotated manually, switch 45 closes but no power is supplied to motor 44 since switch 43 is open. Consequently manual operation of the tuner will not institute automatic self-cycling of the tuner.

Figure 3:
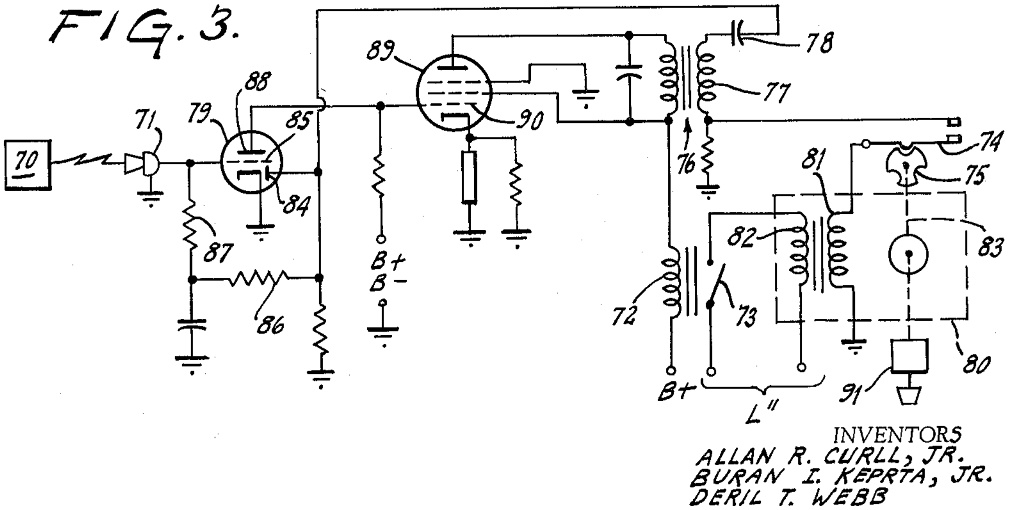
FIGURE 3 is a schematic circuit diagram similar to the foregoing and illustrating still another embodiment of the invention.

The embodiment of the invention illustrated in FIGURE 3 incorporates features of both the preceding embodiment in that the A.C. line L″ is isolated from the chassis ground as is line L of FIGURE 1, and there is provided an auxiliary winding 81 for motor 80. As in the embodiment illustrated in FIGURE 2, a signal applied to the microphone 71 of FIGURE 3 by means of a transmitter 70 will energize relay coil 72 to close switch 73 and apply 120 volts A.C. from source L″ to the main winding 82 of drive motor 80 to energize the same. An indexing switch 74 is closed upon a few degrees of initial rotation of motor shaft 83 to which is coupled indexing wheel 75 and tuner 91. Closing of switch 74 applies voltage induced by main motor winding 82 in motor auxiliary winding 81 through the secondary coil 77 of transformer 76 and condenser 78 to the detector diode 84 of electron tube 79 which develops a negative D.C. potential. This D.C. potential is applied through resistor 86 and 87 to grid 85 of tube 79, and performs the same function as the negative D.C. developed when an A.C. signal from transmitter 70 is applied to grid 85. The negative D.C. voltage applied to grid 85 raises the voltage of its plate 88 and the voltage of grid 90 of electron tube 89 causing the stage, as described in connection with FIGURE 2, to maintain high current through relay coil 72. Relay switch 73 remains closed until motor 80 drives tuner 91 and indexing wheel 75 to the next indexed channel, at which time switch 74 is opened. Opening switch 74 removes the above described 60 cycle A.C. voltage from the detector diode 84 of tube 79 and allows tube 89 to return to its standby current position. This deenergizes relay coil 72 whereby switch 73 is opened to deenergize motor 80 and halt tuner 91 at its selected channel position. Again, and as is the case with respect to the embodiment illustrated in FIGURE 1, when tuner 91 is rotated manually the resultant closing of switch 74 will not initiate automatic stepping of the tuning device since the motor is not enregized to supply energy to the auxiliary coil 81.

From the foregoing description it will be appreciated that the invention affords, in television remote control apparatus, simple and effective electrically controlled holding circuit means that is either manually or remotely actuatable. Moreover, the invention is featured by component elements facilitating initial adjustment and maintenance throughout its use.

We claim:

1. Remote control receiver apparatus responsive to a predetermined transmitted control signal for controlling a mechanism, comprising: signal receiving means responsive to a transmitted signal; frequency responsive circuit means coupled with said signal receiving means and operable to produce an initial period of controlled current flow to respones to a transmitted signal of a frequency to which the circuit means is tuned; electrical motor means including a main winding energizable in response to said current flow and operatively coupled with said mechanism; and auxiliary circuit means coupled with said circuit means for establishing a predetermined sustained period of such current flow to provide for maintaining energization of said motor means, said last recited means comprising an auxiliary winding inductively coupled with said main winding, said sustained period of current flow being derived from such inductive coupling.

2. Apparatus according to claim 1 and characterized by inclusion of switch means disposed in said auxiliary circuit means and adapted to make and to break the same, and indexing means driven with said motor means and operatively coupled with said switch means, whereby said sustained period of current flow is established.

3. Apparatus according to claim 1 and characterized in that said frequency responsive circuit means comprises signal translating means having an input circuit coupled with said signal receiving means and an output circuit for energizing said motor means, and in that said auxiliary circuit means is connected to the input circuit of said signal translating means, the construction and arrangement being such that upon reception of the transmitted signal, said signal translating means output circuit establishes the recited predetermined sustained period of current flow to provide for energization of the motor means, said motor means thereafter being energized by said output circuit as derived from said auxiliary input circuit energized from said auxiliary winding of said motor means.

4. Remote control receiver apparatus responsive to a transmitted control signal for operating controlled apparatus, comprising: signal receiving means responsive to a transmitted signal of limited time duration; frequency responsive circuits coupled to said signal receiving means and operable to produce controlled current flow in response to a transmitted signal of a frequency to which the frequency responsive circuits are tuned; relay coil means connected to said frequency responsive circuits and adapted to have the recited controlled current flow therethrough to energize the coil means; motor means comprising a main winding, and an auxiliary winding inductively coupled with the main winding; an energizing circuit for said motor means; first switch means disposed in said energizing circuit for said motor means and operable upon energization of said relay coil means to energize said motor means, and upon deenergization of said relay coil means to deenergize said motor means; and second switch means actuatable by said motor means and disposed in series electrical circuit with said auxiliary winding and adapted to supply energy induced in the latter to the frequency responsive circuits whereby to condition the same to control energization of the relay coil means, said second switch means being operable, on the one hand, to establish a current flow effective to condition means coupled with said circuits to maintain energizaion of said relay coil means upon cessation of said transmitted signal, and operable, on the other hand, to modify such current flow effectively to deenergize said relay coil means after a predetermined period of energization of the latter.

References Cited by the Examiner

UNITED STATES PATENTS

| | | | |
|---|---|---|---|
| 2,832,924 | 4/1958 | Cilyo | 318—448 |
| 2,890,274 | 6/1959 | Guyton | 318—467 |
| 2,897,354 | 7/1959 | Bourget et al. | 318—467 |
| 2,989,677 | 6/1961 | Marks | 318—467 |
| 2,989,679 | 6/1961 | Guzskie | 318—467 |
| 3,041,519 | 6/1962 | Gardberg | 318—467 |

JOHN F. COUCH, *Primary Examiner.*